United States Patent
Procopio et al.

(10) Patent No.: US 10,346,416 B2
(45) Date of Patent: Jul. 9, 2019

(54) USER EXPERIENCE AND USER FLOWS FOR THIRD-PARTY APPLICATION RECOMMENDATION IN CLOUD STORAGE SYSTEMS

(71) Applicant: Google Inc., Mountain View, CA (US)

(72) Inventors: Michael Jeffrey Procopio, Boulder, CO (US); Eric Benson Schoeffler, Boulder, CO (US)

(73) Assignee: Google LLC, Mountain View, CA (US)

( * ) Notice: Subject to any disclaimer, the term of this patent is extended or adjusted under 35 U.S.C. 154(b) by 160 days.

(21) Appl. No.: 15/099,372

(22) Filed: Apr. 14, 2016

(65) Prior Publication Data

US 2016/0232164 A1 Aug. 11, 2016

Related U.S. Application Data

(63) Continuation of application No. 14/041,819, filed on Sep. 30, 2013, now Pat. No. 9,336,278.

(51) Int. Cl.
*G06F 16/24* (2019.01)
*G06F 16/2457* (2019.01)
*G06Q 30/06* (2012.01)
*G06F 21/62* (2013.01)

(52) U.S. Cl.
CPC .... *G06F 16/24578* (2019.01); *G06F 21/6218* (2013.01); *G06Q 30/0631* (2013.01)

(58) Field of Classification Search
CPC .............. G06F 17/3053; G06F 16/24578
See application file for complete search history.

(56) References Cited

U.S. PATENT DOCUMENTS

| | | | |
|---|---|---|---|
| 7,039,631 B1 * | 5/2006 | Finger, II | G06F 17/30675 |
| 7,617,519 B2 | 11/2009 | Williams | |
| 7,846,023 B2 | 12/2010 | Evans et al. | |
| 8,355,954 B1 * | 1/2013 | Goldberg | G06Q 30/02 705/26.1 |
| 8,407,078 B1 | 3/2013 | Caputo et al. | |
| 8,452,797 B1 | 5/2013 | Paleja et al. | |
| 8,468,164 B1 | 6/2013 | Paleja et al. | |
| 8,612,470 B1 | 12/2013 | Fushman et al. | |

(Continued)

FOREIGN PATENT DOCUMENTS

| | | |
|---|---|---|
| KR | 2003-0016494 | 3/2003 |
| WO | WO 2013/062546 | 5/2013 |
| WO | WO 2014/036936 | 3/2014 |

OTHER PUBLICATIONS

*Apple Computer, Inc.* v. *Franklin Computer Corp.* 714 F.2d 1240 (3d Cir. 1983). (Year: 1983).*

(Continued)

*Primary Examiner* — Robert W Beausoliel, Jr.
*Assistant Examiner* — Nirav K Khakhar
(74) *Attorney, Agent, or Firm* — Lowenstein Sandler LLP

(57) ABSTRACT

A cloud computing system identifies when to recommend applications to a user and what recommendations to make. When the user makes a request related to the applications associated with the user, the cloud computing system identifies the subject of the request. The cloud computing system identifies criteria for recommending applications based on the subject, scores applications available to the user based on the identified criteria, and filters applications based on their scores to recommend applications to the user.

18 Claims, 10 Drawing Sheets

(56) References Cited

U.S. PATENT DOCUMENTS

| | | | |
|---|---|---|---|
| 9,058,612 B2 | 6/2015 | Ben-Itzhak | |
| 9,207,973 B2 | 12/2015 | Clark et al. | |
| 9,489,430 B2* | 11/2016 | Procopio | G06F 16/248 |
| 2004/0155901 A1 | 8/2004 | McKee et al. | |
| 2006/0136389 A1 | 6/2006 | Cover et al. | |
| 2007/0060099 A1 | 3/2007 | Ramer et al. | |
| 2007/0203872 A1 | 8/2007 | Finn et al. | |
| 2008/0243733 A1 | 10/2008 | Black | |
| 2009/0006398 A1 | 1/2009 | Lam et al. | |
| 2009/0089119 A1 | 4/2009 | Ranjan | |
| 2009/0106314 A1 | 4/2009 | Song et al. | |
| 2009/0259998 A1 | 10/2009 | Bergman et al. | |
| 2010/0042608 A1 | 2/2010 | Kane | |
| 2010/0094878 A1 | 4/2010 | Soroca et al. | |
| 2010/0250337 A1 | 9/2010 | Kassaei | |
| 2011/0028138 A1 | 2/2011 | Davies-Moore | |
| 2011/0153853 A1 | 6/2011 | London et al. | |
| 2011/0307354 A1 | 12/2011 | Erman et al. | |
| 2012/0072283 A1 | 3/2012 | DeVore et al. | |
| 2012/0084292 A1 | 4/2012 | Liang et al. | |
| 2012/0096435 A1 | 4/2012 | Manolescu et al. | |
| 2012/0179973 A1 | 7/2012 | Brolley et al. | |
| 2012/0215684 A1* | 8/2012 | Kidron | G06F 15/167 705/39 |
| 2012/0297038 A1 | 11/2012 | Mei et al. | |
| 2012/0303477 A1 | 11/2012 | Ben-Itzhak | |
| 2013/0086553 A1* | 4/2013 | Grechanik | G06F 8/70 717/123 |
| 2013/0103758 A1 | 4/2013 | Alison et al. | |
| 2013/0132896 A1 | 5/2013 | Lee et al. | |
| 2013/0138674 A1 | 5/2013 | Jeong et al. | |
| 2013/0166357 A1 | 6/2013 | Eggs et al. | |
| 2013/0173637 A1 | 7/2013 | Kim et al. | |
| 2013/0185292 A1 | 7/2013 | Li et al. | |
| 2013/0185294 A1* | 7/2013 | Kami | G06Q 30/02 707/732 |
| 2013/0198029 A1 | 8/2013 | Mowatt et al. | |
| 2013/0198506 A1* | 8/2013 | Smith | G06F 1/1684 713/100 |
| 2013/0282750 A1* | 10/2013 | Paul | G06F 16/334 707/767 |
| 2013/0311836 A1* | 11/2013 | Hurst | G06F 11/0742 714/48 |
| 2014/0157173 A1 | 6/2014 | Takayama | |
| 2014/0222952 A1* | 8/2014 | Suryavanshi | H04W 4/20 709/217 |
| 2014/0317031 A1 | 10/2014 | Babenko | |

OTHER PUBLICATIONS

Office Action dated Mar. 15, 2016 in U.S. Appl. No. 14/040,780, (17 pages).

Office Action dated Nov. 4, 2016 in U.S. Appl. No. 14/040,775, (37 pages).

Han, et al., "Efficient Service Recommendation System for Cloud Computing Market", ICIS 2009, Nov. 24-26, pp. 839-845.

IBM Knowledge Center—Administering the Widget Container http://www-01.ibm.com/support/knowledgecenter/SSYGQH_5.0.0/admin/admin/t_admin_common_widget_cocontain.dita?lang=en, retrieved Sep. 28, 2015, 2 pages.

IBM Knowledge Center—Managing images and videos for thumbnails and preview: http://www.01.ibm.com/support/knowledgecenter/api/content/nl/en-us/SSYGQH_5.0.0/admin/admin/t_admin_common_widget_container.dita, retrieved Sep. 28, 2015, 1 page.

International Search Report and Written Opinion for Application No. PCT/US2014/053012 dated Nov. 27, 2014 (10 pages).

International Search Report and Written Opinion for Application No. PCT/US2014/053565 dated Dec. 2, 2014 (8 pages).

MIME Types: http://www.sitepoint.com/web-foundations/mime-types-complete-list/, Apr. 15, 2014, 22 pages.

Su, et al., "A Survey of Collaborative Filtering Techniques," Advances in Artificial Intelligence, vol. 2009 Article ID 42425, Feb. 9, 2009, 19 pages.

Office Action dated Jun. 29, 2016 in U.S. Appl. No. 14/040,780, (18 pages).

* cited by examiner

USER EXPERIENCE AND USER FLOWS FOR THIRD-PARTY APPLICATION RECOMMENDATION IN CLOUD STORAGE SYSTEMS

CROSS REFERENCE TO RELATED APPLICATIONS

This application is a continuation of U.S. patent application Ser. No. 14/041,819 (currently pending), filed Sep. 30, 2013, which is related to PCT Application No. PCT/US2014/053565, filed Aug. 29, 2014, each of which is incorporated herein by reference in its entirety.

BACKGROUND

Personal computers traditionally use only directly accessible resources to run programs and store files. But as network access has become more widespread, it has become feasible to run programs and store files using remote resources. The use of remote resources, commonly referred to as cloud computing, can allow a user to access a file or an application using any device that can access a network. Cloud computing can thereby reduce the user's need for local computer resources and assure the user that, regardless of which device is available, the user will be able to access an up-to-date version of a desired file or application.

Users of existing cloud computing systems often find new applications through serendipity or word of mouth. But if a user only finds applications that are highlighted on a top download list or that she knows to search for by name, she may miss out on applications that might better suit her purposes.

SUMMARY

Thus there exists a need in the art to recommend applications to a cloud computing system's user based on a request by the user. The systems and methods described herein allow a cloud computing system to recommend applications to a user when appropriate.

In certain aspects, the systems and methods described herein relate to recommending an application to a user of a cloud computing service based on a user request. A communications processor of the cloud computing service receives a first user request associated with a cloud computing account holder. In some implementations, the request may be to: access a resource, generate a resource, get more information about an application, get access to an application, manage applications associated with the cloud computing account, or access a new cloud computing account. A recommendation processor of the cloud computing service may identify a criterion associated with the type of the first user request. The recommendation processor may identify a list of applications that are available to the cloud computing account holder and scored based on the identified criterion. The recommendations processor may further filter the list of applications based on the respective scores. In some implementations, the filter is a score threshold. In some such implementations, the threshold may be a predetermined number or may be a function of the scores of the applications on the list. The communications processor may provide the filtered list to the cloud computing account holder as recommendations. In some implementations, the filtered list provides a criterion associated with the score of each application to inform the cloud computing account holder why each application was recommended. As an illustrative example of such an implementation, a user may receive text stating both a name of a recommended application and that the recommended application is commonly used to access files of a particular file type.

In some implementations, if the cloud computing account holder does not request access to a first application on the filtered list within a predetermined period of time, the communications processor may adjust the application's score. In some implementations, the communications processor may receive a second user request to associate an application on the filtered list with the cloud computing account holder, and may fulfill the second request.

BRIEF DESCRIPTION OF THE DRAWINGS

The systems and methods described herein are set forth in the appended claims. However, for the purpose of explanation, several embodiments are set forth in the following drawings.

DETAILED DESCRIPTION

In the following description, numerous details are set forth for the purpose of explanation. However, one of ordinary skill in the art will realize that the implementations described herein may be practiced without the use of these specific details and that the implementations described herein may be modified, supplemented, or otherwise altered without departing from the scope of the systems and methods described herein.

The systems and methods described herein relate to recommending an application to a user of a cloud computing service. In response to a request received from a client device, a cloud computing server may identify a type of the request and at least one criterion associated with the identified type of the request. The cloud computing server may identify a list of applications that are available to the user, with each application on the list scored based on the at least one criterion. The cloud computing server may filter the scored list to determine which applications to recommend. Such filters may, for example, exclude applications that are irrelevant to the user request, that the user is already associated with, that the user has previously rejected installing, or that have a score below a threshold. The cloud computing server may provide the filtered list to the cloud computing account holder with textual or visual information indicating why each application is included in the list. In some implementations, the cloud computing server sorts the filtered list based on scores before providing the list to the cloud computing account holder.

Figure 1:
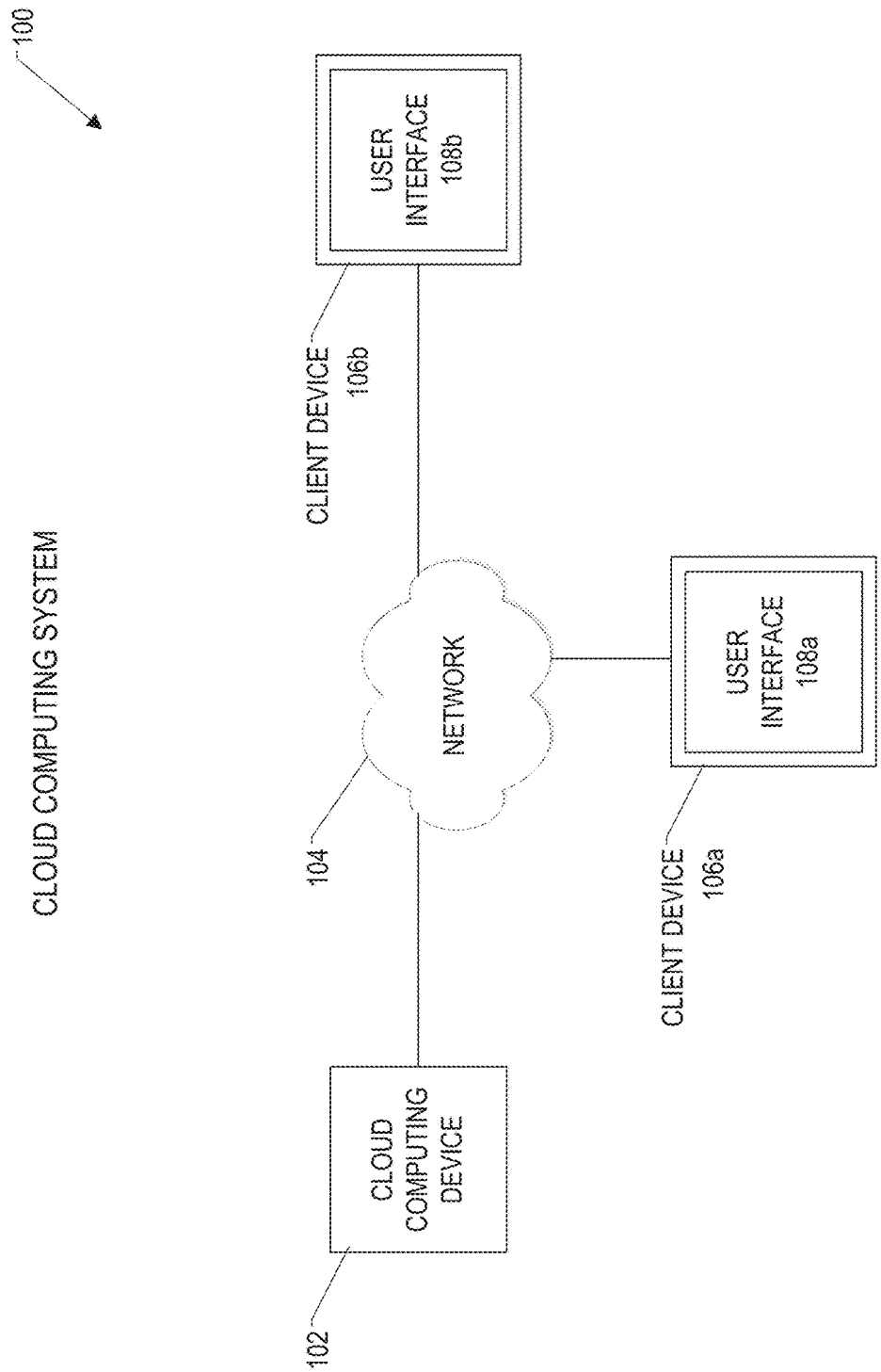
FIG. 1 is a block diagram of a cloud computing system, according to an illustrative implementation.

FIG. 1 is an illustrative block diagram of a cloud computing system 100, in which cloud computing device 102 provides computer services to one or more users. Computer services may include storage of and access to computer files, providing computer applications, or other suitable services. Computer files may include text, pictures, audio files, video files, presentation files, spreadsheets, binary data files, computer instructions, HyperText Markup Language (HTML) files, or other suitable files. Applications may include collaborative document editing software, social media software, or other suitable software, and in some implementations applications provided by cloud computing device 102 may access, generate, revise, or delete computer files stored on cloud computing device 102. Cloud computing device 102 may be a server, a personal computer, a mainframe, a cluster of computing devices, or some other suitable computing device, and is described in more detail in relation to FIG. 2. Services provided by cloud computing device 102 may be accessed via network 104. Network 104 is a computer network, and in certain implementations may be the Internet. One or more users may access the services provided by cloud computing device 102 through client devices 106a and 106b (collectively, client devices 106) and respectively mediated by user interfaces (UIs) 108a or 108b (collectively, UIs 108). A client device 106 may generate its respective UI 108 based on instructions received from cloud computing device 102.

A client device 106 is a computing device used to access the services provided by cloud computing device 102, and may be a personal laptop computer, a personal desktop computer, a tablet computer, a smartphone, a game console, or some other suitable computing device. Although two client devices 106 are depicted for simplicity, there may be a different number of client devices 106. In some implementations, a user may access cloud computing device 102 using one or more client devices 106, such as by accessing a service with a laptop while also accessing a service using a smartphone. In some implementations, more than one user may use a client device 106 to access cloud computing device 102. In certain implementations, a client device 106 may be associated with a cloud computing account on cloud computing device 102. In such implementations, the client device 106 may provide information identifying itself to cloud computing device 102 upon first connecting to cloud computing device 102, and cloud computing device 102 may provide a service to the client device 106 upon verifying the identity of the client device 106.

UI 108 is an interface through which a user may access services associated with cloud computing device 102. UI 108 may be an application that is run by client device 106 and displays information received from cloud computing device 102, such as a web browser or other suitable application. UI 108 may also send requests to cloud computing device 102 in response to a predetermined action by a user, which may include selecting an icon using a cursor or a touchscreen, selecting a menu option using a cursor or a touchscreen, generating a text command, or other suitable action. Illustrative examples of what is requested may include: a list of applications capable of accessing a file, a list of the types of files a user may generate, a list of the applications associated with a user account, information regarding an application, access to an application, a list of files associated with a user account, and a list of application recommendations.

Cloud computing system 100 allows users to access services provided by cloud computing device 102. Client device 106 connects to cloud computing device 102 through network 104. Cloud computing device 102 may then provide services to a user by transmitting data to client device 106. As described in relation to FIGS. 2-9, cloud computing device 102 may respond to certain user requests by transmitting a list of suggested applications to a client device 106. The content of such a list may be based on the user request that prompted cloud computing device 102 to transmit the list.

Figure 2:
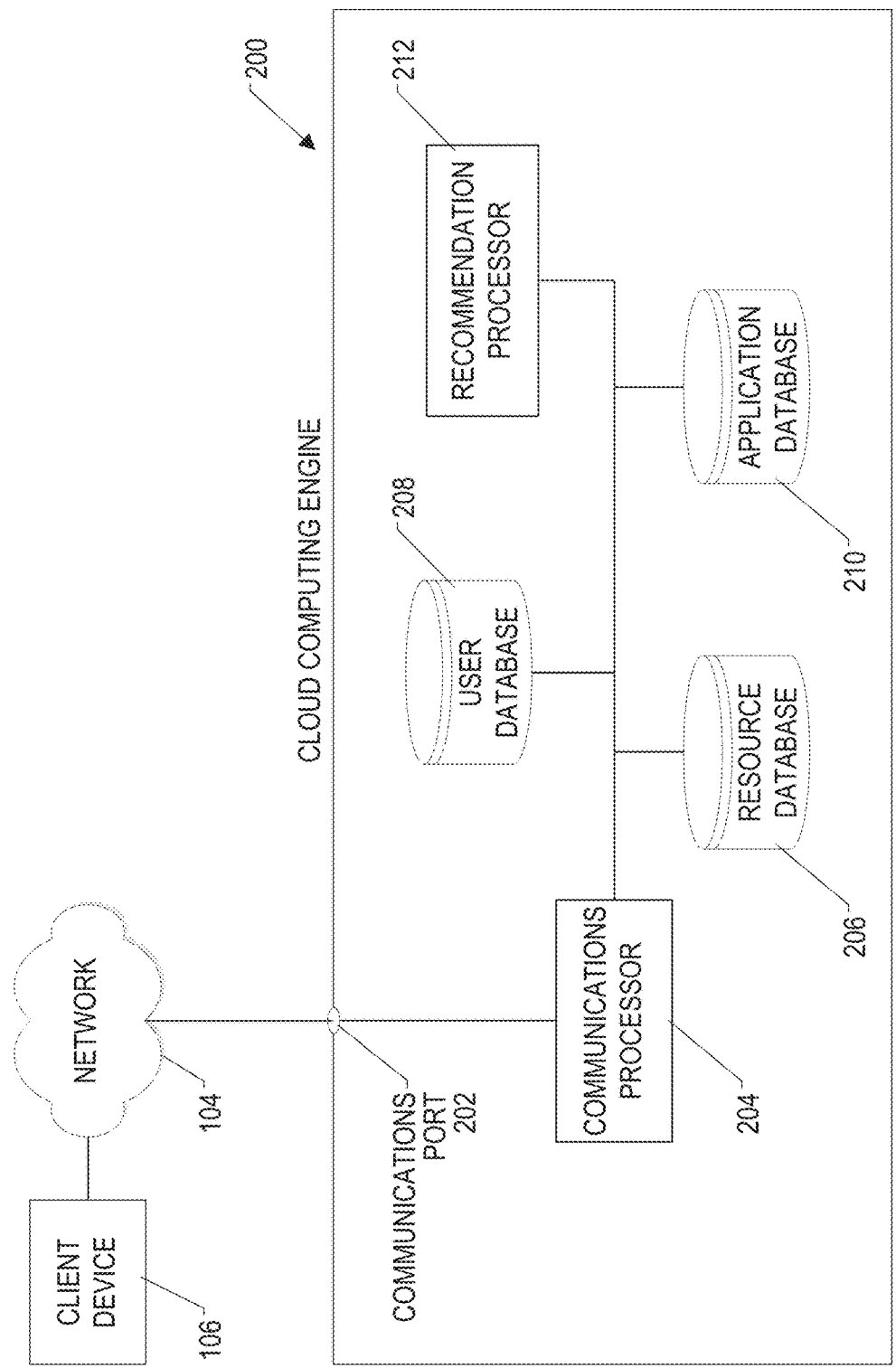
FIG. 2 is a block diagram of a cloud computing engine, according to an illustrative implementation.

FIG. 2 is an illustrative block diagram of a cloud computing engine 200, which may act as the cloud computing device 102 of FIG. 1. Cloud computing engine 200 may provide services to one or more client devices 106 via network 104. Cloud computing engine 200 transmits and receives data through communications port 202. Communications processor 204 identifies user requests received through communications port 202 and transmits information to the client device 106 based on the received requests. Resource database 206 may store files, user database 208 may store information regarding cloud computing accounts, and application database 210 may store information regarding applications. In certain implementations, application database 210 may also store the applications themselves. Recommendation processor 212 may generate application recommendations by scoring and filtering lists of applications based on the information stored in user database 208 and the received user requests.

The depicted communications port 202 is a network port that receives user commands via network 104 and transmits information and file contents sent by cloud computing engine 200. Communications port 202 may include a 100BASE-TX port, a 1000BASE-T port, a 10GBASE-T port, a Wi-Fi antenna, a cellular antenna, or other suitable network ports. In certain implementations, there may be a different number of ports than are depicted.

Communications processor 204 may be a computer processor that acts on or routes data received through communications port 202 to provide cloud computing services requested by a user. Cloud computing services may include storing, retrieving, or altering files, listing files or cloud computing services available to a user, or other suitable services. To determine how and whether to act on data received through communications port 202, communications processor 204 may identify a cloud computing account associated with a connection. In certain implementations, communications processor 204 identifies the cloud computing account associated with a connection by comparing information provided during the initial connection to information stored in user database 208. Communications processor 204 may further identify a client device 106 associated with a connection or a request from packet headers identifying the source of received data, by querying the client device 106, from information provided by the client device 106 at login, or through some other suitable method of identifying client device 106. In certain implementations, communications processor 204 may encrypt communications to and decode communications from a client device 106 using the Secure Sockets Layer (SSL) protocol, the Transport Layer Security (TLS) protocol, or another suitable protocol.

Communications processor 204 may respond to predetermined types of user requests by requesting a filtered, scored list of application recommendations for a user from recommendation processor 212. The type of a request may be based on what is being requested. For example, a request may be for a list of application recommendations, a list of applications available to open a file, generating a new file, gaining access to an application, accessing a new user account, or other suitable types of user requests. Communications processor 204 may include information regarding the user request when requesting a filtered, scored list of application recommendations from recommendation processor 212. Such information may include the type of the user request, the type of the client device 106 from which the user request was received, the cloud computing account associated with the user request, or other suitable information.

Communications processor 204 may also detect and block unauthorized access to services provided by cloud computing engine 200. Unauthorized access may be detected by comparing one or more of a username and password combination, information identifying a client device 106, geographic information associated with the client device 106, or other suitable information with information stored in user database 208. If communications processor 204 detects an unauthorized access attempt, communications processor 204 may transmit a message to a client device 106 or a system administrator, block a client device 106, temporarily lock the cloud computing account, or take some other predetermined action. In certain implementations, if a client device 106 has not previously been connected to cloud computing engine 200, communications processor 204 requires identification information before providing services to client device 106. Identification information may include a username and password combination, an identification number provided to the user by a voice or text message sent to a telephone number previously provided by the user, or other predetermined identification information.

In certain implementations, communications processor 204 verifies that an application is allowed to access a file by searching resource database 206, user database 208, and application database 210 to determine whether the application is associated with the file type of the file, whether the user has authorized the application to access the file or the file type of the file, or other suitable verification information. In some such implementations, communications processor 204 verifies a security token provided by the application against information stored in one or more of resource database 206, user database 208, or application database 210. If an application is not authorized to access a file, communications processor 204 may prevent the application from accessing the file, transmit a message to the user or a system administrator, or take some other suitable action. In certain implementations, such a message to the user may ask if the user wishes to authorize the application to access the file.

Resource database 206 may be a computer-readable and -writable medium storing at least one file associated with a cloud storage system 100. Files stored in resource database 206 may be text, images, audio files, video files, spreadsheets, presentation files, HTML files, or other suitable computer files. Resource database 206 may also store metadata associated with each file, which may include a Multipurpose Internet Mail Extension (MIME) type of the file or other suitable indication of the file type of the file. In certain implementations, file metadata may also indicate one or more client computing accounts authorized to view or edit the file, the application used to generate the file, a default application for accessing the file, a record of when and by whom the file was previously accessed or edited, or other suitable information. In some implementations, a portion of resource database 206 may be accessed through a remote network, and may be a third-party database.

User database 208 may be a computer-readable and -writable medium storing information regarding at least one cloud computing account. Information regarding a cloud computing account may include one or more of a username and password associated with the account, a list of the files associated with the account, a list of applications associated with the account, a list of applications authorized to access each file or file type associated with the account, a rating the account holder has given to one or more applications, application recommendations that the account holder has ignored, application recommendations that the user has accepted, application recommendations that the user has explicitly rejected, how often each application associated with the account is used by the account holder, how often the account holder accesses a file or file type with each application associated with the account, the distribution of file types within the files associated with the cloud computing account (referred to as a "file type signature"), a list of at least one client device 106 associated with the user, user-specified preferences, or other suitable user information.

Application database 210 may be a computer-readable and -writable medium storing information regarding applications associated with cloud computing engine 200, which may include identifying information, access information, use information, or other suitable information.

Identifying information regarding an application may include, for example, its name, an icon, a short description, a long description, and screenshots of the application in use. Some or all of such information may be transmitted to client device 106 for display in response to a request, as depicted in FIGS. 3-9.

Access information stored in application database 210 may include a link to access an application, a link to download an application, compiled or uncompiled computer instructions comprising an application, or other suitable access information. In some implementations, computer instructions stored by application database 210 may be written in HTML, JavaScript, Asynchronous JavaScript and XML (Ajax), or another suitable computer language, and may be performed by a web browser run on a client device 106. In certain implementations, an application may be executed by cloud computing engine 200 and one or more outputs from the application may be transmitted to a client device 106 for display.

Use information regarding an application may include user ratings of the application, how many cloud computing accounts the application is associated with, how many cloud computing accounts the application has been disassociated from, how often the application is used, the length of time the application is kept active when it is accessed, how often the application is used to access a file type, how often users accept recommendations to associate the application with their account, the circumstances in which the application was recommended to a user that associated the application with a cloud computing account, or other suitable information regarding who uses the application or how they use it.

In some implementations, use information may include the file type signature of cloud computing accounts associated with the application, how often the application is associated with a cloud computing account that is also associated with a second application, or other suitable correlations.

In some implementations, some information described as being stored in resource database 206, user database 208, or application database 210 may be stored in or copied to one or more of the other two depicted databases. In some implementations, two or more of the three depicted databases may be combined into a single database.

Recommendation processor 212 may be a computer processor that filters lists of applications to provide users with application recommendations. As described in relation to FIG. 9, recommendation processor 212 may generate application recommendations by identifying a score for each application in a set of applications, identifying recommendation filters, and applying the identified filters to the set of scored applications. The set of applications may include all applications available to a cloud computing account of cloud computing engine 200, or may be a pre-filtered set of applications. As an illustrative example of the latter, if recommendation processor 212 is generating a filtered list of applications capable of editing image files, recommendation processor 212 may only score applications capable of editing image files.

Whether or not the set of applications is pre-filtered, recommendation processor 212 identifies the score for each application in the set based on a user request. The recommendation processor 212 may also base the score on the matter being requested, the cloud computing account associated with the request, the client device 106 that transmitted the request, or other suitable information regarding the request. As illustrative examples, if the user request is associated with a document file, the identified score may be a function of the frequency with which other users who have the application use it to edit document files; if the user request is made by a smartphone, applications designed for mobile computing devices may be scored more highly than applications designed for laptop computers; an application's score may be reduced if a user previously requested more information regarding the application but did not subsequently request that the application be associated with the cloud computing account. Various methods of generating scored lists of applications for recommendation to a user are further described in the following co-pending applications: U.S. patent application Ser. No. 14/040,782, entitled "SYSTEMS AND METHODS FOR DETERMINING APPLICATION INSTALLATION LIKELIHOOD BASED ON PROBABILISTIC COMBINATION OF SUBORDINATE METHODS," which is hereby incorporated by reference herein in its entirety; U.S. patent application Ser. No. 14/040,772, entitled "SYSTEMS AND METHODS FOR DETERMINING APPLICATION INSTALLATION LIKELIHOOD BASED ON INSTALLATION CHARACTERISTICS," which is hereby incorporated by reference herein in its entirety; U.S. patent application Ser. No. 14/040,775, entitled "SYSTEMS AND METHODS FOR DETERMINING APPLICATION INSTALLATION LIKELIHOOD BASED ON FILE TYPE CHARACTERISTICS," which is hereby incorporated by reference herein in its entirety; U.S. patent application Ser. No. 14/040,779, entitled "SYSTEMS AND METHODS FOR DETERMINING APPLICATION INSTALLATION LIKELIHOOD BASED ON USER FILE TYPE DISTRIBUTION," which is hereby incorporated by reference herein in its entirety; and U.S. patent application Ser. No. 14/040,780, entitled "SYSTEMS AND METHODS FOR DETERMINING APPLICATION INSTALLATION LIKELIHOOD BASED ON USER NETWORK CHARACTERISTICS," which is hereby incorporated by reference herein in its entirety.

Recommendation processor 212 may also identify recommendation filters based on the distribution of scores among the set of applications, the client device 106 that will receive the filtered list, a cloud computing account associated with the client device 106, or some other suitable basis. Illustrative examples of filters include a filter that: excludes any application that has a score below a predetermined threshold; includes only a predetermined number of the highest-scored applications, where the number is based on the visual space available to display the list; includes all applications with a score in a range that is a function of the scores of all applications in the set, such as all applications with a score more than two standard deviations higher than the average score in the set; includes only applications with a score above a threshold, where the threshold is a function of the scores; and excludes applications that have previously been associated with the cloud computing account or that have been explicitly rejected when previously recommended to the user associated with the cloud computing account. Recommendation processor 212 may apply more than one such filter to the scored list of applications, and may provide the filtered list to communications processor 204 for provision to client device 106.

Cloud computing engine 200 may recommend applications to a user in the course of providing services to the user. When communications port 202 receives a transmission from client device 106 via network 104, communications processor 204 may identify a cloud computing account associated with the transmission and that the transmission is related to a user request. If communications processor 204 further identifies that the user request meets predetermined criteria for providing application recommendations to the user, communications processor 204 requests a filtered list of applications from recommendation processor 212. Recommendation processor 212, in turn, may score applications in application database 210 based on the request and information stored in resource database 206 and user database 208. Recommendation processor 212 may filter the scored list based on the request, on the generated application scores, and on information stored in user database 208, and provides the filtered list to communications processor 204. Communications processor 204 provides the filtered list to client device 106, and, if the user accepts a recommendation, may associate the recommended application with the user's cloud computing account.

Figure 3:
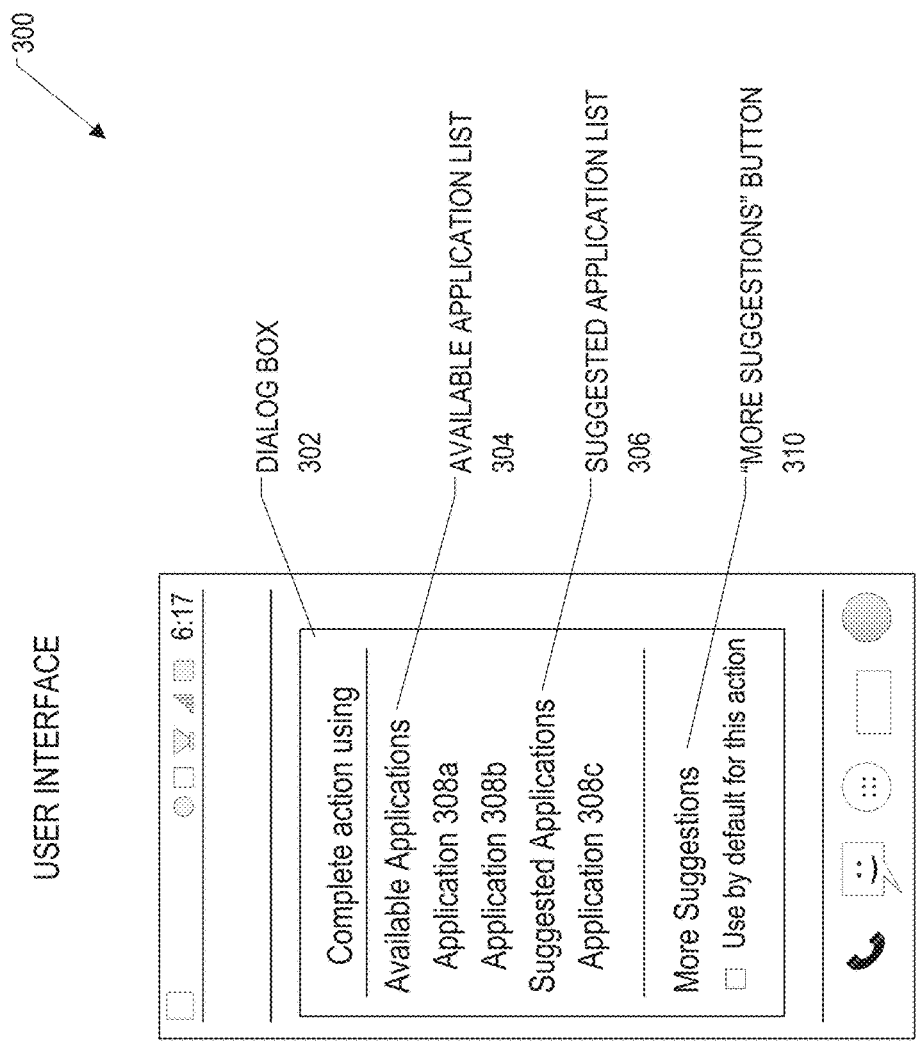
FIG. 3 depicts an exemplary screenshot of a user interface recommending applications for accessing a file on a cloud computing system, according to an illustrative implementation.

FIG. 3 depicts an exemplary screenshot of a UI 300 recommending applications for accessing a file on the cloud computing system. UI 300 may be UI 108 of FIG. 1. As depicted, UI 300 is the UI of a mobile computing device, such as a smartphone or a tablet computer, but a laptop, desktop, or other suitable computing device could present a similar UI. UI 300 presents dialog box 302, an "Open With" dialog generated in response to a user request for a list of applications that can be used to access a file. As depicted, dialog box 302 presents the user with an available application list 304 (including applications 308a and 308b), a suggested application list 306 (including application 308c), and a "more suggestions" button 310.

Both available application list 304 and suggested application list 306 list applications that are capable of accessing the file referred to by dialog box 302. But applications in available application list 304 are already associated with the cloud computing account, while applications in suggested application list 306 are not. As described in relation to FIG. 2, suggested application list 306 may be generated by scoring a set of applications capable of accessing the file based on one or more characteristics that may be directly related to the file (an illustrative example of which is how often each application is used to access the file type of the file) or may not be (an illustrative example of which is the cost of the application), and by filtering the scored set of applications to identify which applications to recommend to the user.

There may be different numbers of applications than are depicted in list 304, in list 306, or in both lists. The number of applications listed may vary based on the implementation, the cloud computing account being accessed through UI 300, the client device 106 displaying UI 300, the file type of the file referred to by dialog box 302, or on another suitable basis. In some implementations, dialog box 302 may include one or more scrollbars to allow a larger number of applications to be included in available application list 304 or suggested application list 306. In some implementations, suggested application list 306 may provide information regarding application 308c and other applications included in list 306, or about each application 308. Such information may include a reason why each application was included, an average user rating of each application, a price of each application, or other suitable information. Reasons given for why an application was included in list 306 are based on the score given to the application, and thus may include that the recommended application is capable of accessing the indicated file type, that other users commonly use the recommended application to access files of the indicated file type, that users who have been allowed to access files associated with the cloud storage account have ranked the recommended application highly, or other suitable reasons.

UI 300 may respond to a user's selection of application 308a or 308b from list 304 by launching the selected application and instructing the selected application to access the file indicated in the initial request. UI 300 may respond to a user's selection of application 308c from list 306 by presenting the user with information regarding application 308c and offering the user an opportunity to associate application 308c with the cloud computing account, or by directly associating application 308c with the cloud computing account. UI 300 may respond to a user's selection of "more suggestions" button 310 by displaying an expanded version of suggested applications list 306, by replacing application 308c with another application recommendation, or otherwise providing further application recommendations. In some implementations, UI 300 may provide a button that a user may select to temporarily or permanently hide suggested application list 306 or to temporarily or permanently remove application 308c from suggested application list 306.

Figure 4:
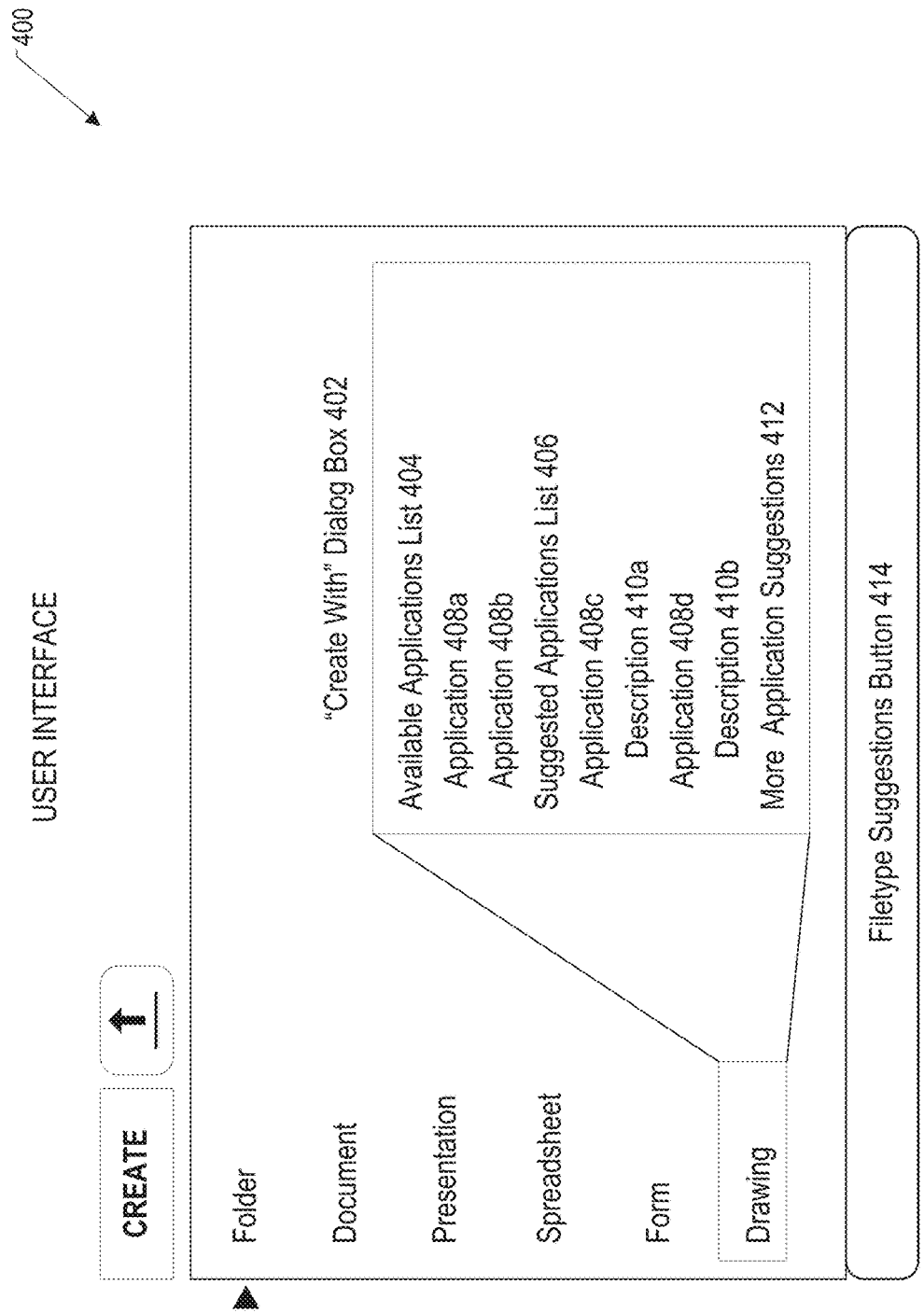
FIG. 4 depicts an exemplary screenshot of a user interface recommending applications for generating a file on a cloud computing system, according to an illustrative implementation.

FIG. 4 depicts an exemplary screenshot of a UI 400 recommending applications for generating a file on a cloud computing system. UI 400 may be UI 108 of FIG. 1. As depicted, UI 400 is the UI of a laptop computer, but a smartphone, a tablet computer, or other suitable computing device could present a similar UI. UI 400 presents dialog box 402, a "Create With" dialog that may be generated in response to a user request for a list of applications that can be used to generate a file, here depicted as a file of a "drawing" file type. As depicted, dialog box 402 presents the user with an available application list 404, a suggested application list 406, and a "more application suggestions" button 412. Available application list 404 is depicted as including applications 408a and 408b, and suggested application list 406 is depicted as including applications 408c and 408d with respective descriptions 410a and 410b. There may be a different number of applications included in either or both lists. In some implementations, dialog box 402 may include one or more scrollbars to allow a larger number of applications to be included in available application list 404 or suggested application list 406. UI 400 may also present a "file type suggestions" button 414 that a user may select to receive suggestions of applications that can generate file types that the user cannot generate with any of the applications associated with the user's cloud computing account.

Both available application list 404 and suggested application list 406 list applications that are capable of generating a file of the file type referred to by dialog box 402. But applications in available application list 404 are already associated with the cloud computing account, while applications in suggested application list 406 are not. As described in relation to FIG. 2, recommendation processor 212 may generate suggested application list 406 by scoring and filtering a set of applications capable of generating a file of the file type based on one or more characteristics of the applications. Such characteristics may include how often each application is used to generate files of the file type, the cost of the application, or other suitable characteristics of the applications. In some implementations, UI 400 may provide a button that a user may select to temporarily or permanently hide suggested application list 406 or to temporarily or permanently remove application 408c or application 408d from suggested application list 406.

Descriptions 410a and 410b (collectively, descriptions 410) are respectively associated with applications 408c and 408d and provide information regarding their associated applications. A description 410 may indicate file types its corresponding application can generate or access, an average user rating, a price, other users with whom the corresponding application is associated, or other suitable information. In some implementations, a different description 410 may be provided for the same application recommendation based on one or more of the user to whom the application is being recommended, the type of the file to be generated, the score received by the application, or other suitable bases.

UI 400 may respond to a user selection of button 412 by displaying an expanded version of suggested applications list 406, by replacing one or both of applications 408c and 408d with another application recommendation, or otherwise providing further application recommendations. In some implementations, a user attempt to scroll past the end of list 404 or 406 may also or alternatively prompt UI 400 to include more applications in the respective list.

A user may select "file type suggestions" button 414 to request file types that cannot be generated by any applications associated with the user's cloud computing account. Referring to FIG. 2, recommendation processor 212 may generate such a list by compiling a list of file types that can be generated by applications in application database 210, removing those file types that can be generated by applications associated with the cloud computing account, and presenting the resulting list to the user. In some implementations, recommendation processor 212 may also score and filter these file type recommendations based on factors similar to those used to score and filter application recommendations as described in relation to FIG. 2. Such factors may include the number of files of each file type in resource database 206; the number of users in user database 208 associated with each file type; the number of users who are associated with files of the file type and are associated with, have a similar file type signature to, or use similar applications as the user who selected button 414; the highest or average score of the applications capable of generating each file type; or other appropriate bases.

UI 400 may respond to a user's selection of application 408a or 408b from list 404 by launching the selected application and instructing the selected application to generate a file of the file type indicated in the initial request. UI 400 may respond to a user's selection of application 408c or 408d from list 406 by presenting the user with information regarding the selected application and offering the user an opportunity to associate the selected application with the user's account, or by directly associating the selected application with the cloud computing account. UI 400 may respond to a user's selection of button 412 by displaying an expanded version of suggested applications list 406, by replacing applications 408c and 408d with other application recommendations, or otherwise providing further application recommendations. UI 400 may respond to a user's selection of button 414 by displaying a list of suggested file types, and listing one or more applications associated with each file type. Such a list of suggested file types may also provide information regarding the file type or information regarding the associated applications.

Figure 5:
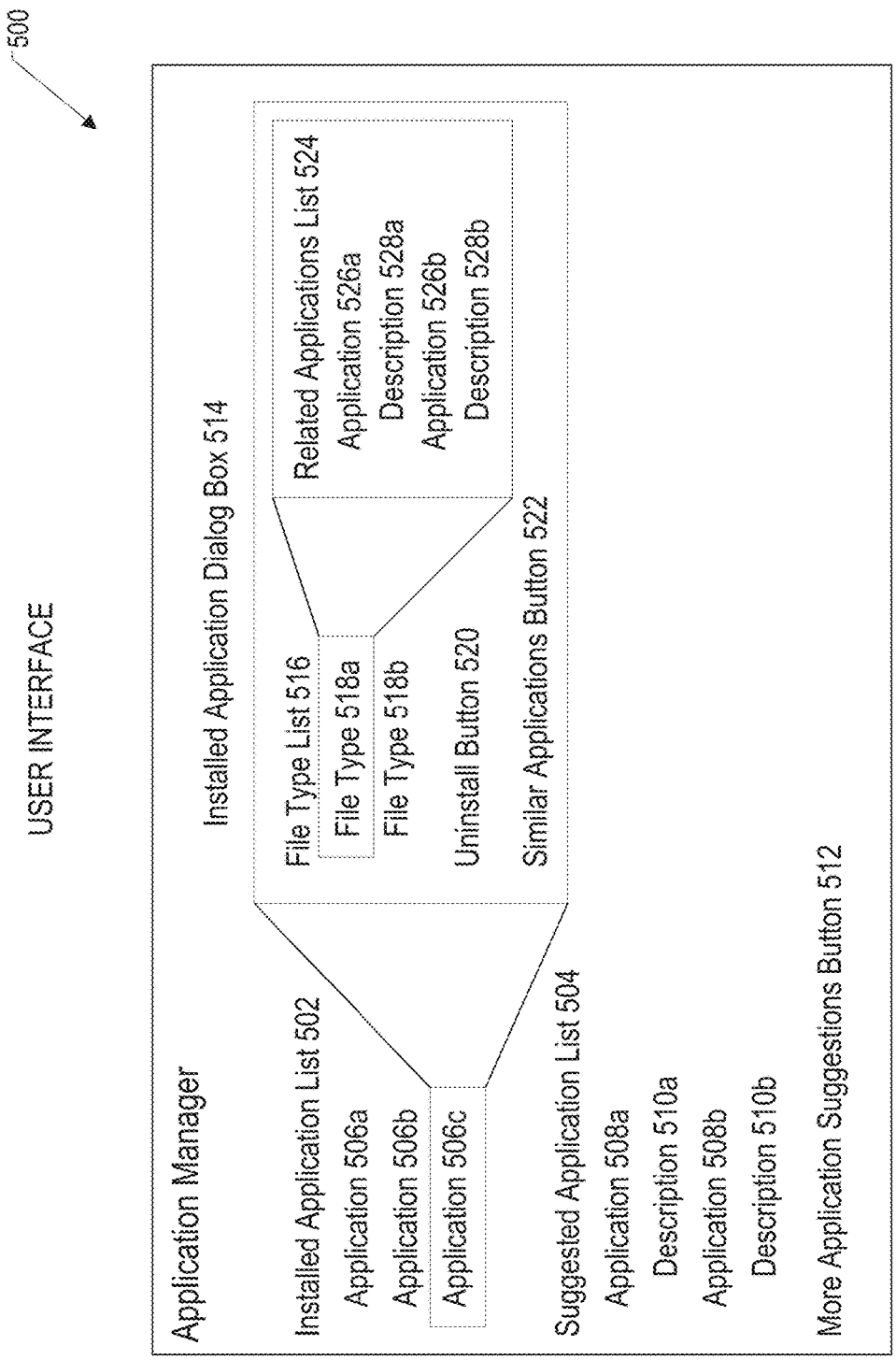
FIG. 5 depicts an exemplary screenshot of a user interface for managing applications associated with a cloud computing account, according to an illustrative implementation.

FIG. 5 depicts an exemplary screenshot of a UI 500 for managing applications associated with a cloud computing account. UI 500 may be UI 108 of FIG. 1. As depicted, UI 500 is the UI of a laptop computer, but a UI of a smartphone, tablet computer, or other suitable computing device may present a similar UI. UI 500 presents an installed application list 502, a suggested application list 504, a "more application suggestions" button 512, and, in response to a user selection of an application from installed application list 502, an installed application dialog box 514.

Installed application list 502 includes applications 506a-c (collectively, applications 506), which are associated with a cloud computing account. An application 506 may be associated with a cloud computing account by being installed on a client device 106 associated with the account, or by being available for a user to access through cloud computing device 102. There may be a different number of applications in installed application list 502 than are here depicted, and UI 500 may allow a user to scroll through application list 502 if the cloud computing account is associated with more applications 506 than can be displayed in UI 500.

Suggested application list 504 includes applications 508a-b (collectively, applications 508) with respective descriptions 510a-b (collectively, descriptions 510). Each application 508 on suggested application list 504 is an application that a user may associate with her cloud computing account. As described in relation to FIG. 2, recommendation processor 212 may generate suggested application list 504 by scoring and filtering a set of applications available to be associated with the cloud computing account based on one or more characteristics of the application or the user. Such characteristics may include the cost of the application, the file type signature of the user, the average rating of the application by other users who have shared access to a file of the user, or other suitable characteristics. In some implementations, UI 500 may provide a button that a user may select to temporarily or permanently hide suggested application list 504 or to temporarily or permanently remove application 508a or application 508b from suggested application list 504. If a user selects an application 508, UI 500 may provide the user with more information regarding application 508, as depicted in relation to FIG. 7, or may associate application 508 with the cloud computing account.

A description 510 associated with an application 508 may include a reason why the associated application 508 was included in list 504, an average user rating of the associated application 508, a price of the associated application 508, or other suitable information. In some implementations, a different description 510 may be provided for the same application 508 based on the user to whom the application is being recommended, the score received by the application, or other suitable bases.

UI 500 may respond to a user selecting button 512 by displaying an expanded version of suggested applications list 504, by replacing applications 508a-b with recommendations of other applications 508, or otherwise providing further application recommendations. In some implementations, a user attempt to scroll past the end of list 504 may also or alternatively prompt UI 500 to include more applications in list 504.

As depicted, a user has selected application 506c, in response to which UI 500 displays installed application dialog box 514. Installed application dialog box 514 includes file type list 516, which indicates the file types 518a-b (collectively, file types 518) that application 506c can access; uninstall button 520, which the user can select to remove the association between application 506c and the user's account; and "similar applications" button 522, which the user may select to request a list of applications similar to application 506c from cloud computing device 102. Although two file types 518 are depicted, file type list 516 may include a different number of file types, and in some implementations dialog box 514 may allow the user to scroll through file type list 516 to see more file types 518. In some implementations, application dialog box 514 may also or alternatively allow a user to rate application 506c, to make application 506c the default application for opening a file type 518, to make application 506c the default application for generating a file type 518, to remove permission for application 506c to access file type 518, or to otherwise alter the association between application 506c and the user's account. In some implementations, dialog box 514 may include a list similar to suggested application list 504 in addition to or in replacement of button 522. In such implementations, the applications on the list may have been scored and filtered based on similarity to application 506c, such as by which file types they can access, the file type signatures of the users they are associated with, or on some other suitable basis.

As depicted, file type 518a has been selected in dialog box 514. In response, UI 500 further displays a related application list 524, which, as depicted, includes applications 526a and 526b (collectively applications 526). Applications 526 are applications capable of accessing file type 518a, and are respectively associated with descriptions 528a and 528b (collectively descriptions 528). In response to a user selecting an application 526, UI 500 may present the user with information regarding the selected application and offering the user an opportunity to associate the selected application with the user's account, as depicted in relation to FIG. 7, or may associate the selected application with the cloud computing account.

A description 528 may include a reason why its associated application 526 was included in list 524, an average user rating of the associated application 526, a price of each associated application 526, or other suitable information. In some implementations, a different description 510 may be provided for the same application 508 based on the user to whom the application is being recommended, the score received by the application, or other suitable bases.

In some implementations, UI 500 may present a button like button 512 in related application list 524, and may add or replace applications 526 in list 524 in response to a user pressing such a button or attempting to scroll past the end of list 524. In some implementations, UI 500 may provide a button that a user may select to temporarily or permanently remove application 526a or application 526b from related application list 524.

UI 500 may show a different number of one or more of applications 506, applications 508, file types 518, and applications 526 than are depicted. In some implementations, UI 500 may include scroll bars on one or more of list 502, list 504, list 516, and list 524 according to the length of the respective list and the available display space.

Figure 6:
FIG. 6 depicts an exemplary screenshot of a user interface welcoming a user to a new cloud computing account, according to an illustrative implementation.

FIG. 6 depicts an exemplary screenshot of a UI 600 welcoming a user to a new cloud computing account. UI 600 may be UI 108 of FIG. 1. As depicted, UI 600 is the UI of a laptop computer, but a UI of a smartphone, tablet computer, or other suitable computing device may present a similar UI. In some implementations, a similar UI may also be presented when a user accesses an account not associated with any files or applications. As depicted, UI 600 presents a user with an option to take a tour of the features of the new account and with a list 602 of applications recommended for installation. As depicted, list 602 includes applications 604a-c (collectively, applications 604), which are respectively associated with descriptions 606a-c (collectively, descriptions 606).

Each application 604 on list 602 is an application that a user may associate with her account. As described in relation to FIG. 2, recommendation processor 212 may generate list 602 by scoring and filtering a set of applications available to be associated with the cloud computing account based on one or more characteristics of the application or the user. Such characteristics may include the cost of the application, whether the application is associated with or rated highly by another user who invited the user to create the cloud computing account, whether the application is associated with or rated highly by other users associated with the user by social networking or other relational information, or other suitable characteristics. In some implementations, UI 600 may provide a button that a user may select to temporarily or permanently hide list 602 or to temporarily or permanently remove one or more applications 604 from list 602. If a user selects an application 604, UI 600 may provide the user with more information regarding application 604, as depicted in relation to FIG. 7, or may associate application 604 with the cloud computing account.

A description 606 associated with an application 604 may include an average user rating of the associated application 604, a price of the associated application 604, an indication of how often the application is associated with other cloud computing accounts, or other suitable information. In some implementations, a different description 606 may be provided for the same application 604 based on identifiable connections between the user and other users or other suitable bases.

Figure 7:
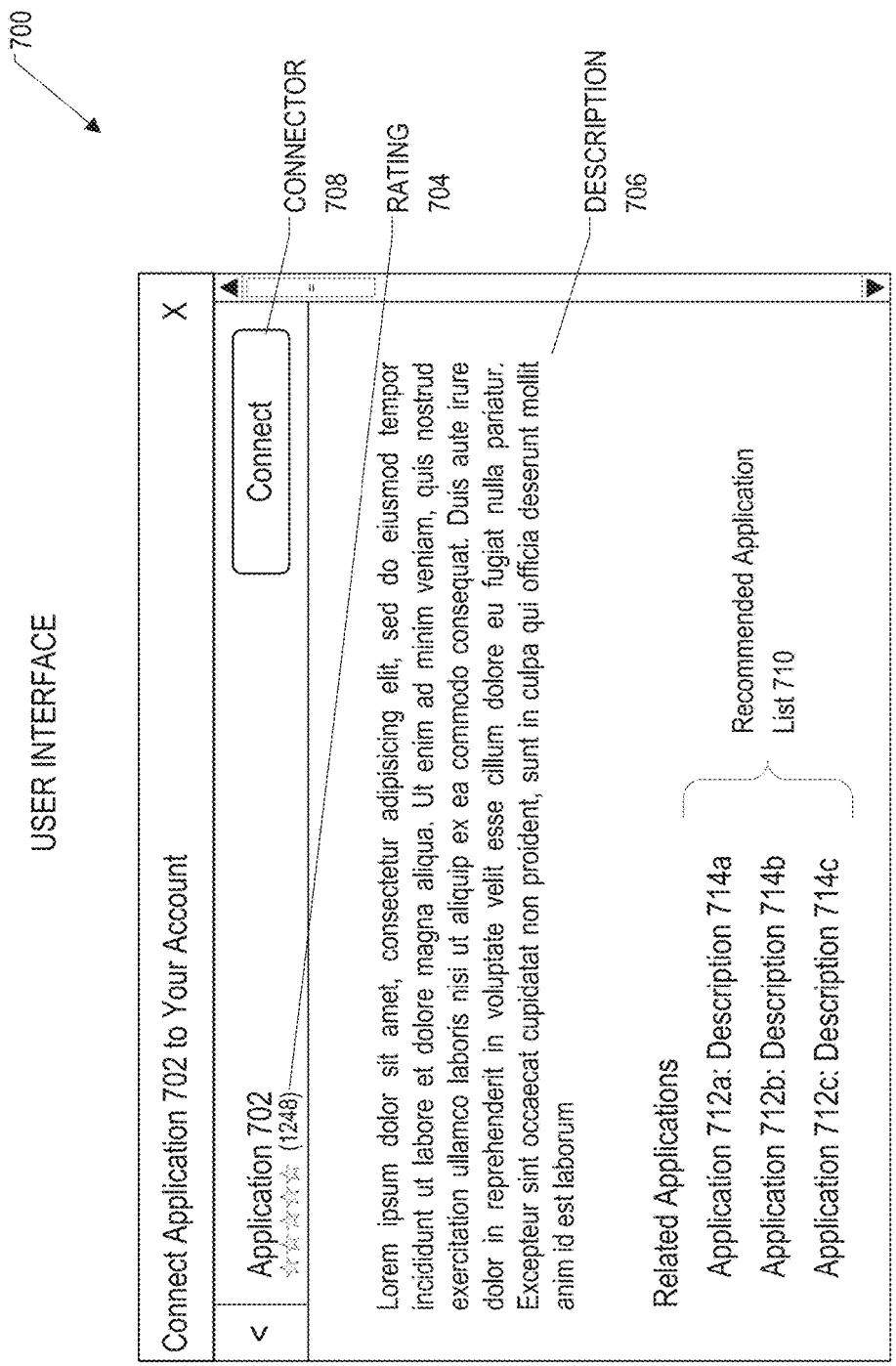
FIG. 7 depicts an exemplary screenshot of a user interface presenting information regarding an application, according to an illustrative implementation.

FIG. 7 depicts an exemplary screenshot of a UI 700 presenting information regarding an application 702. UI 700 indicates an average rating 704 of application 702 by users, a description 706 of the application, a button 708 for associating application 702 with a cloud computing account, and a recommended application list 710 of applications related to application 702. Description 706 may be provided by the application developer, by the administrator of cloud computing device 102, or by some other suitable entity. In some implementations, UI 700 may also or alternatively provide screenshots of the application in use, testimonials regarding the application by its users, or other suitable information. If a user wishes to associate application 702 with the user's cloud computing account, the user may select connector 708, thereby generating a request to cloud computing device 102 for access to application 702. Cloud computing device 102 may then provide the user with access to application 702 by installing application 702 on client device 106, by allowing the user to access application 702 as run by cloud computing device 102, or by providing access to the user in some other suitable fashion.

Recommended application list 710 includes applications 712a-c (collectively, applications 712) with respective descriptions 714a-c (collectively, descriptions 714). Each application 712 on recommended application list 710 is an application that a user may associate with her cloud computing account, and there may be a different number of applications 712 than are depicted. As described in relation to FIG. 2, recommendation processor 212 may generate recommended application list 710 by scoring and filtering a set of applications available to be associated with the cloud computing account based on one or more characteristics of each application 712 or the user. Such characteristics may include whether an application 712 can access the same file types as application 702, whether users who are associated with application 702 are also associated with the application 712, the cost of the application 712, the file type signature of both the user and other users who are associated with both application 702 and the application 712, the average rating of the application 712 by other users who have shared access to a file of the user, or other suitable characteristics.

A description 714 associated with an application 712 may include a reason why the associated application 712 was included in list 710, an average user rating of the associated application 712, a price of the associated application 712, or other suitable information. In some implementations, a different description 714 may be provided for the same application 712 based on one or more of the user to whom the application is being recommended, the score received by the application, or other suitable bases.

In some implementations, UI 700 may provide a button that a user may select to temporarily or permanently hide recommended application list 710 or to temporarily or permanently remove an application 712 from suggested application list 710. If a user selects an application 712, UI 700 may replace information related to application 702 with information related to application 712 or may associate application 712 with the cloud computing account. In some implementations, UI 700 may add applications 712 to or replace applications 712 in list 710 in response to a user pressing a designated button or attempting to scroll past the end of list 710.

Figure 8:
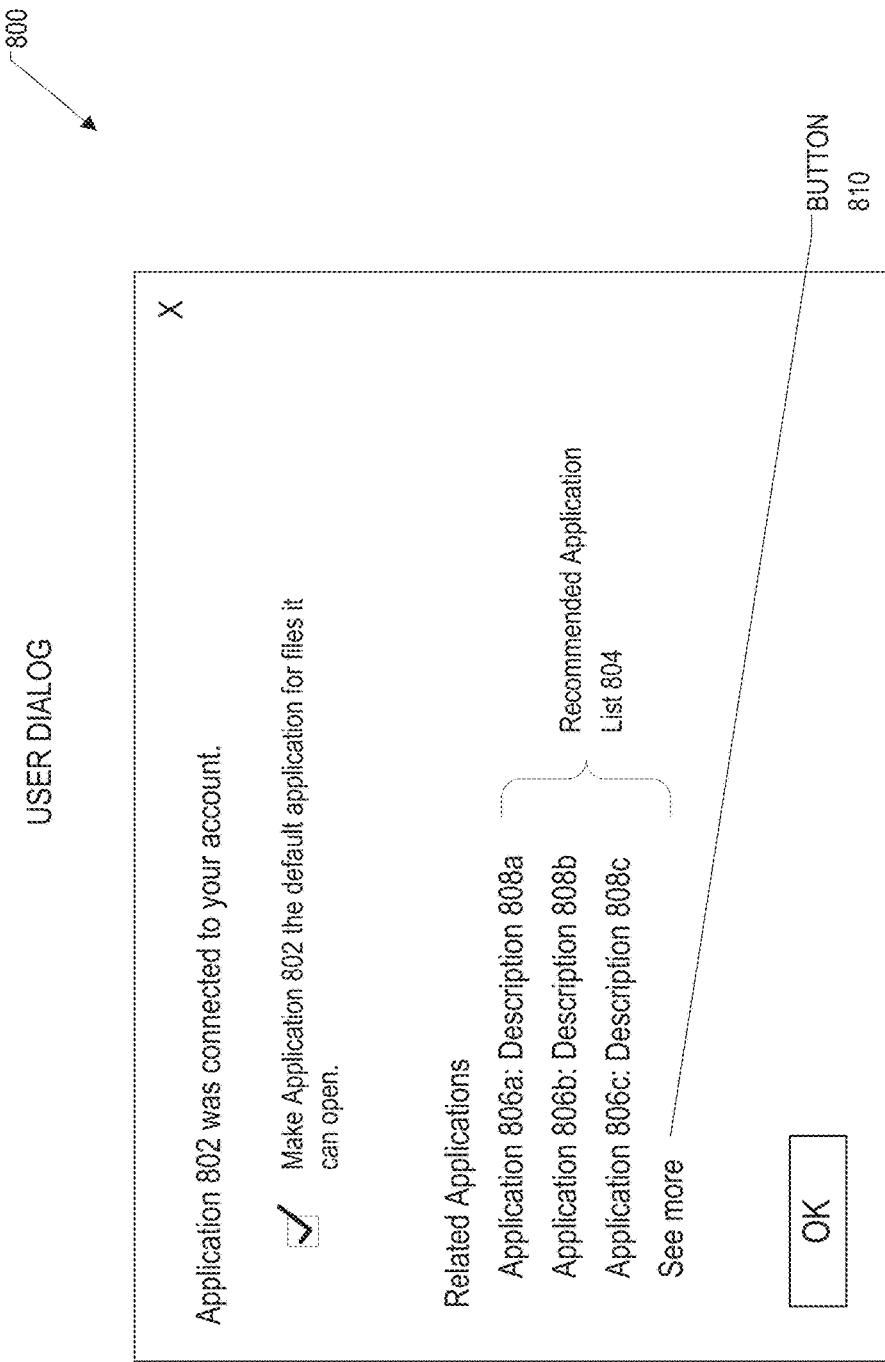
FIG. 8 depicts an exemplary screenshot of a user dialog displayed in response to an application becoming associated with a cloud computing account, according to an illustrative implementation.

FIG. 8 depicts an exemplary screenshot of a user dialog 800, displayed by a UI 108 in response to an application 802 becoming associated with a cloud computing account. User dialog 800 informs a user that an application 802 has been associated with the cloud computing account, and provides the user with an option of making application 802 the default application for accessing files of a file type that may be accessed by application 802. In some implementations, user dialog 800 may allow the user to specify that application 802 will be such a default for some file types but not others. User dialog 800 may also present the user with a recommended application list 804.

Recommended application list 804 includes applications 806a-c (collectively, applications 806), descriptions 808a-c (collectively, descriptions 808) regarding respective applications 806, and a button 810 to add further applications 806 to the list. A user may associate any or all of applications 806 with her cloud computing account. There may be a different number of applications 806, and in some implementations the user may be allowed to scroll through the list to see other applications 806. As described in relation to FIG. 2, recommendation processor 212 may generate recommended application list 804 by scoring and filtering a set of applications available to be associated with the cloud computing account based on one or more characteristics of each application 806 or the user. Such characteristics may include whether an application 806 can access the same file types as application 802, whether users who are associated with application 802 are also associated with the application 806, the cost of the application 806, the file type signature of both the user and other users who are associated with both application 802 and the application 806, the average rating of the application 806 by other users who have shared access to a file of the user, or other suitable characteristics.

A description 808 associated with an application 806 may include a reason why the associated application 806 was included in list 804, an average user rating of the associated application 806, a price of the associated application 806, or other suitable information. In some implementations, a different description 808 may be provided for the same application 806 based on the user to whom the application is being recommended, the score received by the application, or other suitable bases.

The user may select button 810 to be provided with more applications 806. If the user selects button 810, user interface 108 may replace applications 806 with other applications 806 or may add further applications 806. In some implementations, the user may also or alternatively request more application recommendations by attempting to scroll past the end of recommended application list 804. In some such implementations, user dialog 800 does not include button 810.

Figure 9:
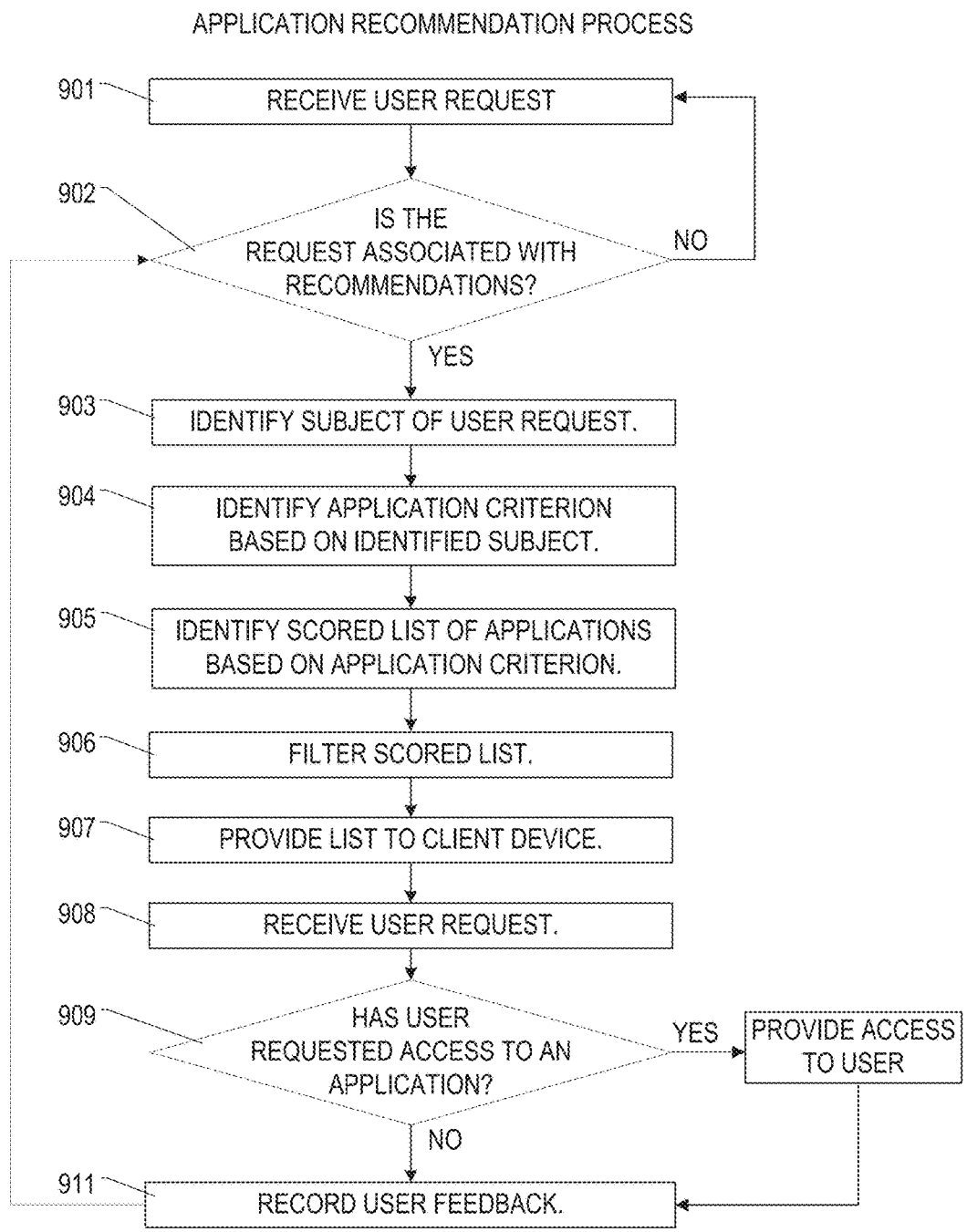
FIG. 9 is a flow chart of a process for recommending applications to a user, according to an illustrative implementation.

FIG. 9 is a flow chart of an application recommendation process 900. Application recommendation process 900 identifies when to recommend applications to a user and which applications to recommend. Referring to FIG. 2, application recommendation process 900 begins with step 901, in which communications processor 204 receives a user request sent from a client device 106. Then, in step 902, communications processor 204 identifies whether application recommendations should be made in response to the user request. Communications processor 204 may identify whether recommendations should be made based on whether the request falls into a predetermined category. If not, process 900 returns to step 901; otherwise, communications processor 204 identifies a subject of the user request in step 903. The subject may be applications that can access a resource associated with a cloud computing account, applications that can generate a file of a designated file type, management of applications associated with a cloud computing account, access to a new user account, information regarding an application, associating an application with a cloud computing account, or other suitable subjects. Communications processor 204 may then request a list of applications recommended based on the subject from recommendation processor 212.

In step 904, recommendation processor 212 may identify at least one application criterion based on the subject identified in step 903. An application criterion is a basis for selecting applications to recommend to a user, and may be based on which users are associated with an application or how users interact with an application. Illustrative examples of possible application criteria include how often users access the file type indicated in the request with an application; how users rate an application; and the average length of time before users remove an application from their accounts. Recommendation processor 212 may identify application criteria based on a predetermined relationship between identified request subjects and application criteria. Application criteria may also be based on all users associated with cloud computing engine 200 or on a subset of such users, such as users similar or related to the user associated with the request. As an illustrative example, an application criteria may include how often an application is used by such similar or related users and give less or no weight to application use by other users. Users may be considered similar if they have a similar file type signature, are associated with the same applications, give similar ratings to the same applications, share the same interests on an associated social networking website, or meet other suitable criteria. Users may be related if they share resources on cloud computing engine 200, are linked on an associated social networking website, or meet other suitable criteria.

In some implementations, the relationship between a request subject and application criteria may change over time. In an illustrative example of such an implementation, recommendation processor 212 may be programmed to modify the relationship between request subjects and application criteria over time based on how often users accept application recommendations based on identified application criteria.

In some implementations recommendation processor 212 may also identify application criteria based on more factors than simply the subject identified in step 903. Such further factors may include the user associated with the request of step 901, the client device 106 associated with the request of step 901, or other suitable factors. As illustrative examples of such implementations, communications processor 212 may identify an application cost criterion only for users who rarely or never spends money on applications, or may score applications based on whether they are optimized for the client device 106 which generated the request of step 901.

In implementations in which more than one application criteria may be associated with a subject, recommendation processor 212 may also identify the relative importance of each identified criteria. Relative importance may be expressed by a weighting or may be expressed as a tiebreaker. As an illustrative example of the former, a high average user rating for an application may be considered half as important as how often users actually use the application to access files. As an illustrative example of the latter, if two applications have the same average user rating, variability in user ratings may be used as a tiebreaker between the two.

In step 905, recommendation processor 212 scores each application in a set of applications based on the one or more application criteria identified in step 904. The set of applications may be a set of the applications scored in application database 210, such as those applications in application database 210 that are not already associated with the cloud computing account associated with the request of step 901. The set of applications may include only applications meeting a criterion identified in step 904. As an illustrative example, if step 904 identifies the criterion of whether an application can generate a file of a designated file type, the set of applications may only include those applications that can generate files of the designated file type. As each application criterion identifies characteristics of an application, each application in the set is scored based on the extent to which they meet each application criterion. As an illustrative example, if a criterion is the average user rating of the application, then each application's user rating may be its score. If multiple criteria were identified in step 904, recommendation processor 212 may identify an overall score for each application in the set according to the relative importance of the different criteria. In some implementations, recommendation processor 212 may identify application scores by receiving the score from a computer processor or server programmed to score an application according to an application criterion, referred to as a scorer.

In step 906, recommendation processor 212 may filter the scored list identified in step 905. A filter may correspond to the scores identified in step 905, the cloud computing account associated with the request of step 901, or other suitable criteria, and more than one filter may be applied. Filters based on the scores identified in step 905 may select a predetermined number of applications with the highest score, all applications with a score greater than a predetermined threshold, all applications with a score greater than a threshold that is a function of the identified scores, or applications with other suitable scores. In some implementations, a filter may be generated using an algorithm that automatically assigns each application score into one of two classes, one class consisting of applications that will be recommended and the other of applications that won't be recommended. The algorithm in such implementations may be the k-means clustering algorithm or another suitable algorithm. Filters based on a cloud computing account may include filters excluding applications that were previously associated with the cloud computing account, filters excluding applications that were previously rejected when recommended for association with the cloud computing account, filters excluding applications that were previously recommended for association with the cloud computing account and were ignored a predetermined number of times, or other suitable filters. In some implementations, recommendation processor 212 may also sort the filtered list based on the scores of the remaining applications. In some implementations, recommendation processor 212 maintains the unfiltered scored list temporarily, allowing a rapid response to a user request for further application recommendations, such as in the case that a user selects button 310 of FIG. 3.

In step 907, communications processor 204 routes the filtered list from recommendation processor 212 to the client device 106 that generated the request of step 901. The list may thus be presented to a user as is depicted in relation to FIGS. 3-8. As depicted in relation to FIGS. 4-8, the filtered list may include information describing the applications on the list or indicating why the application was one of the applications that passed through the filter. Once the client device 106 has received the filtered list, the user may make further requests in connection with the filtered list.

In step 908, communications processor 204 receives a user request transmitted by client device 106. In step 909, communications processor 204 determines whether the user has requested access to an application on the list. If not, process 900 proceeds directly to step 911; otherwise, in step 910, communications processor 204 associates the application with the cloud computing account, which may include installing the application on a client device 106 associated with the user, altering information in one or more of user database 208 and application database 210 to allow the user to access the application through cloud computing engine 200, or other suitable measures. Once the application has been associated with the cloud computing account, communications processor 204 may instruct client device 106 to launch the application.

Whether or not step 910 takes place, process 900 proceeds to step 911. In step 911, communications processor 204 records user feedback in one or both of user database 208 and application database 210. User feedback may be direct or indirect. Direct feedback may include a user rejecting a recommendation, a user accepting a recommendation, or other suitable actions. Indirect feedback may include a user requesting more information regarding a recommendation, ignoring a recommendation, asking for further recommendations, taking more than a predetermined period of time to make a further user request after receiving a recommendation, or other suitable actions. Such user feedback may be used as an application criterion of step 904 or for filtering scored lists in step 906. As an illustrative example of the former, if an application is frequently ignored when recommended, it may receive a lower score than an application that is usually accepted as a recommendation. As an illustrative example of the latter, step 906 may filter out applications that a user has ignored multiple times to avoid wasting space on recommendations that the user is likely to ignore again.

Feedback that consists of failing to act on a recommendation may be weighted differently based on how the user ignored the recommendation. Referring to FIG. 8 for an illustrative example, a user clicking "OK" one second after being presented with user dialog 800 may have less weight than the user clicking "OK" ten seconds after being presented with user dialog 800. Referring further to FIG. 7, ignoring recommendations after being presented with user dialog 800 may in turn be considered less significant than a user accessing UI 700 but not clicking "connect." Ignoring a recommendation after being given the opportunity to consider it may be treated more like an explicit rejection of the recommendation than simply ignoring the recommendation.

Once communications processor 204 records any feedback, process 900 returns to step 902, now considering whether the request received in step 908 is a request appropriate for recommendations. Thus, process 900 may continue to identify when to make recommendations and which recommendations to make. A user may stop process 900 by instructing cloud computing engine 200 to not make any recommendations.

Figure 10:
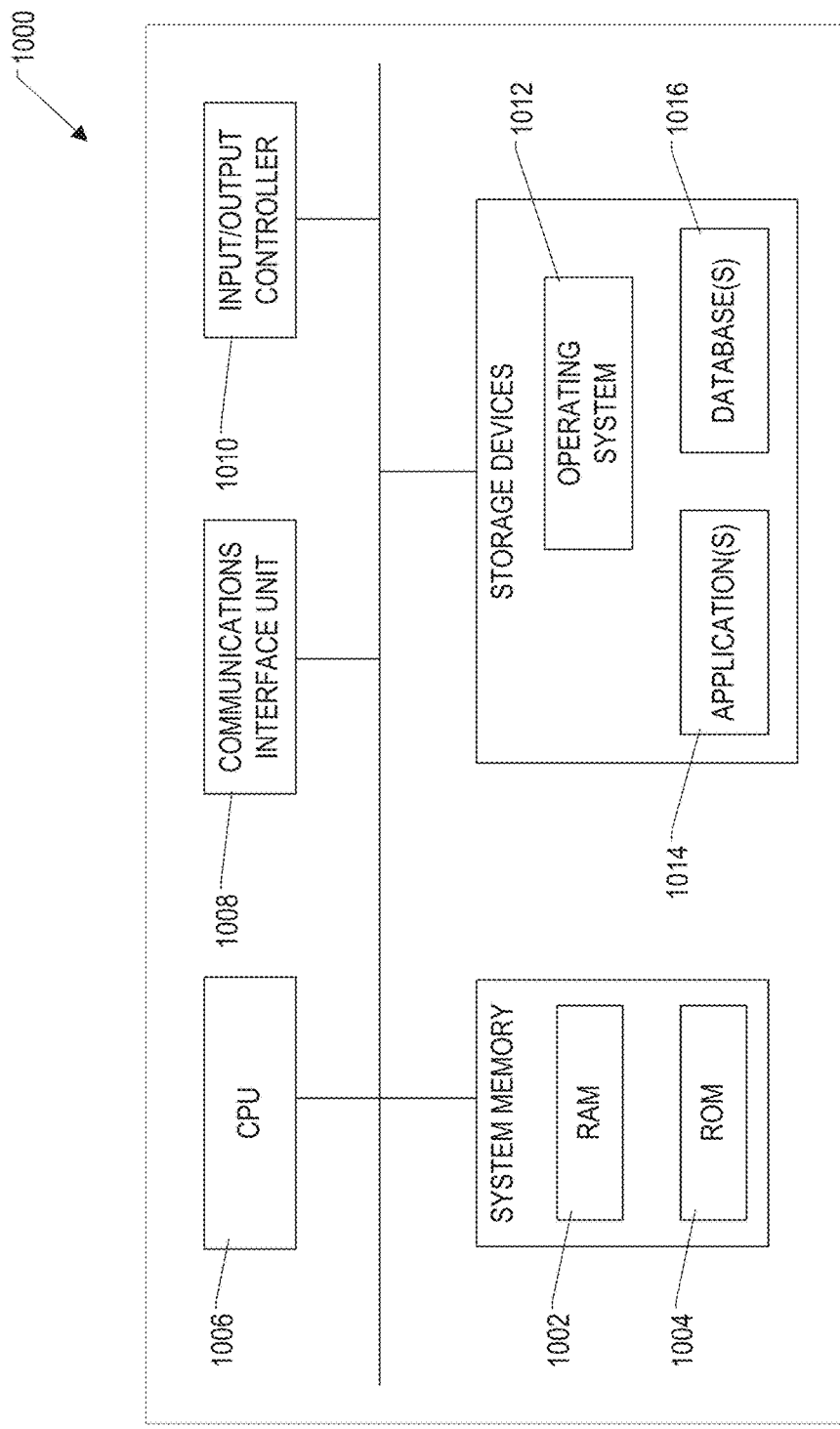
FIG. 10 is a block diagram of a computing device for performing any of the processes described herein, according to an illustrative implementation.

FIG. 10 is a block diagram of a computing device that can be used to implement or support any of the components of the system of FIG. 1 or 2, and for performing any of the processes described herein. Cloud computing engine 200 may be implemented on one or more computing devices 1000 having suitable circuitry, and client device 106 may communicate with cloud computing device 102 through one or more computing devices 1000 having suitable circuitry. In certain aspects, a plurality of the components of cloud storage system 100 may be included within one computing device 1000. In certain implementations, a component and a storage device may be implemented across several computing devices 1000.

The computing device 1000 comprises at least one communications interface unit, an input/output controller 1010, system memory, and one or more data storage devices. This can support a network connection such as a connection to network 104 in FIG. 1. The system memory includes at least one random access memory (RAM 1002) and at least one read-only memory (ROM 1004). RAM 1002 can support the resource database 206 of FIG. 2, for example. All of these elements are in communication with a central processing unit (CPU 1006) to facilitate the operation of the computing device 1000. The computing device 1000 may be configured in many different ways. For example, the computing device 1000 may be a conventional standalone computer or alternatively, the functions of computing device 1000 may be distributed across multiple computer systems and architectures. In FIG. 10, the computing device 1000 may be linked, via network or local network, to other servers or systems.

The computing device 1000 may be configured in a distributed architecture, wherein databases and processors are housed in separate units or locations. Some units perform primary processing functions and contain, at a minimum, a general controller or a processor and a system memory. In distributed architecture implementations, each of these units may be attached via the communications interface unit 1008 to a communications hub or port (not shown) that serves as a primary communication link with other servers, client or user computers, and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM, and TCP/IP.

The CPU 1006 comprises a processor, such as one or more conventional microprocessors and one or more supplementary co-processors such as math co-processors for offloading workload from the CPU 1006. The CPU 1006 is in communication with the communications interface unit 1008 and the input/output controller 1010, through which the CPU 1006 communicates with other devices such as other servers, user terminals, or devices. The communications interface unit 1008 and the input/output controller 1010 may include multiple communication channels for simultaneous communication with, for example, other processors, servers, or client terminals.

The CPU 1006 is also in communication with the data storage device. The data storage device may comprise an appropriate combination of magnetic, optical, or semiconductor memory, and may include, for example, RAM 1002, ROM 1004, flash drive, an optical disc such as a compact disc, or a hard disk or drive. The CPU 1006 and the data storage device each may be, for example, located entirely within a single computer or other computing device; or connected to each other by a communication medium, such as a USB port, serial port cable, a coaxial cable, an Ethernet cable, a telephone line, a radio frequency transceiver, or other similar wireless or wired medium or combination of the foregoing. For example, the CPU 1006 may be connected to the data storage device via the communications interface unit 1008. The CPU 1006 may be configured to perform one or more particular processing functions.

The data storage device may store, for example, (i) an operating system 1012 for the computing device 1000; (ii) one or more applications 1014 (e.g., computer program code or a computer program product) adapted to direct the CPU 1006 in accordance with the systems and methods described here, and particularly in accordance with the processes described in detail with regard to the CPU 1006; or (iii) database(s) 1016 adapted to store information that may be utilized to store information required by the program. The depicted database 1016 can be any suitable database system, and can be a local or distributed database system.

The operating system 1012 and applications 1014 may be stored, for example, in a compressed, an uncompiled and an encrypted format, and may include computer program code. The instructions of the program may be read into a main memory of the processor from a computer-readable medium other than the data storage device, such as from the ROM 1004 or from the RAM 1002, or from a computer data signal embodied in a carrier wave, such as that found within the well-known Web pages transferred among devices connected to the Internet. While execution of sequences of instructions in the program causes the CPU 1006 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to a cloud storage system as described herein. The program also may include program elements such as an operating system 1012, a database management system, and "device drivers" that allow the processor to interface with computer peripheral devices (e.g., a video display, a keyboard, a computer mouse, etc.) via the input/output controller 1010.

The term "computer-readable medium" as used herein refers to any non-transitory medium that provides or participates in providing instructions to the processor of the computing device 1000 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1006 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1000 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communications port as electrical, electromagnetic, or optical signals, which are exemplary forms of wireless communications or data streams that carry various types of information.

Some implementations of the above described may be implemented by the preparation of application-specific integrated circuits or by interconnecting an appropriate network of conventional component circuits, as will be apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. For example, cloud computing engine 200 may record information about when users accept recommendations and when they do not, and may provide such information to application developers to guide decisions regarding application pricing and what to say in describing their applications. Likewise, application criteria may be modified or replaced according to how well they predict whether a user will accept an application recommendation. Moreover, client device 106 may generate requests for application recommendations that include recommendation criteria rather than communications processor 204. It should be understood that various alternatives to the embodiments of the disclosure described herein may be employed in practicing the disclosure. Elements of an implementation of the systems and methods described herein may be independently implemented or combined with other implementations. It is intended that the following claims define the scope of the disclosure and that methods and structures within the scope of these claims and their equivalents be covered thereby.

What is claimed is:

1. A computer-implemented method comprising:
identifying a type of a first user request pertaining to at least one file, wherein the first user request is associated with a cloud storage account holder;
identifying a filtered list of applications, wherein an application in the filtered list is associated with a score that is based on the type of the first user request and one or more of the at least one file, the cloud storage account holder, or the application, and wherein the application in the filtered list is available to the cloud storage account holder;
providing the filtered list to the cloud storage account holder for presentation in response to the first user request pertaining to the at least one file; and
wherein the filtered list is based on a predetermined number of applications and excludes one or more designated applications.

2. The method of claim 1, further comprising:
determining that the cloud storage account holder does not request access to the application in the filtered list within a predetermined period of time; and
in response to determining that the cloud storage account holder does not request access to the application within the predetermined period of time, adjusting at least the score associated with the application.

3. The method of claim 1, further comprising:
receiving a second user request to associate the application in the filtered list with the cloud storage account holder; and
associating the application in the filtered list with the cloud storage account holder.

4. The method of claim 1, wherein the filtered list includes at least one application associated with a score above a threshold and the threshold is a function of scores associated with the filtered list of applications.

5. The method of claim 1, wherein the filtered list includes at least one application associated with a score above a threshold and the threshold is a predetermined number.

6. The method of claim 1, further comprising filtering the filtered list based on a client device associated with the cloud storage account holder and at least one criterion associated with the type of user request.

7. The method of claim 1, wherein the one or more designated applications are designated based on previous inclusion on at least one filtered list.

8. The method of claim 1, wherein the filtered list is sorted based on scores of the applications.

9. A system comprising at least one processor in communication with an application database configured to store information regarding a plurality of applications and a user database configured to store information associating at least one cloud storage account holder with at least one application, wherein the at least one processor is configured to:
identify a type of a first user request pertaining to at least one file, wherein the first user request is associated with a cloud storage account holder;
identify a filtered list of applications, wherein an application in the filtered list is associated with a score that is based on the type of the first user request and one or more of the at least one file, the cloud storage account holder or the application, and wherein the application in the filtered list is available to the cloud storage account holder;
provide the filtered list to the cloud storage account holder for presentation in response to the first user request pertaining to the at least one file; and
wherein the filtered list is based on a predetermined number of applications and excludes one or more designated applications.

10. The system of claim 9, wherein the at least one processor is further configured to:
determine that the cloud storage account holder does not request access to the application in the filtered list within a predetermined period of time; and
in response to determining that the cloud storage account holder does not request access to the application within a predetermined period of time, adjust at least the score associated with the application.

11. The system of claim 9, wherein the at least one processor is further configured to:
receive a second user request to associate the application in the filtered list with the cloud storage account holder; and
associate the application with the cloud storage account holder.

12. The system of claim 9, further comprising a resource database for storing one or more resources associated with the at least one cloud storage account holder and metadata associated with each of the one or more resources, wherein the metadata associated with each of the one or more resources indicates an application used to generate each of the one or more resources.

13. The system of claim 9, wherein the filtered list includes at least one application associated with a score above a threshold and the threshold is a function of scores associated with the applications.

14. The system of claim 9, wherein the filtered list includes at least one application associated with a score above a threshold and the threshold is a predetermined number.

15. The system of claim 9, wherein the at least one processor is further configured to filter the applications based on a client device associated with the cloud storage account holder and at least one criterion associated with the type of user request.

16. The system of claim 9, wherein the one or more designated applications are designated based on previous inclusion on at least one filtered list.

17. The system of claim 9, wherein the at least one processor is further configured to sort the filtered list based on scores of the applications.

18. The system of claim 9, wherein the user database is further configured to store information regarding application preferences indicated by each of the at least one cloud storage account holders.

* * * * *